United States Patent
Ha et al.

(10) Patent No.: US 11,820,931 B2
(45) Date of Patent: Nov. 21, 2023

(54) LIQUID CRYSTAL POLYESTER RESIN COMPOSITION AND ELECTRONIC COMPONENT MATERIAL CONTAINING THE SAME

(71) Applicant: SEYANG POLYMER, Incheon (KR)

(72) Inventors: Tae-Young Ha, Incheon (KR); Hyuk Jin Kim, Jincheon-gun (KR); Soo Min Park, Daejeon (KR); Hong Sun Na, Hwaseong-si (KR); Sun Hwa Jang, Yongin-si (KR); Youn Eung Lee, Daejeon (KR); Jin Kyu Lee, Hwaseong-si (KR)

(73) Assignee: SEYANG POLYMER, Incheon (KR)

( * ) Notice: Subject to any disclaimer, the term of this patent is extended or adjusted under 35 U.S.C. 154(b) by 0 days.

(21) Appl. No.: 17/367,671

(22) Filed: Jul. 6, 2021

(65) Prior Publication Data

US 2022/0204852 A1  Jun. 30, 2022

(30) Foreign Application Priority Data

Dec. 29, 2020 (KR) .......................... 10-2020-0186502

(51) Int. Cl.
*G02F 1/1333* (2006.01)
*C09K 19/38* (2006.01)
*C08L 67/02* (2006.01)
*C08K 3/30* (2006.01)

(52) U.S. Cl.
CPC ............ *C09K 19/3809* (2013.01); *C08K 3/30* (2013.01); *C08L 67/02* (2013.01); *C08K 2003/3009* (2013.01); *C08K 2003/3045* (2013.01)

(58) Field of Classification Search
CPC ............ C09K 19/3809; C09K 19/3838; C09K 19/3804; C09K 19/3833; C08K 3/30; C08K 2003/3009; C08K 2003/3045; C08L 67/02
See application file for complete search history.

(56) References Cited

U.S. PATENT DOCUMENTS

2022/0204852 A1 *  6/2022  Ha ........................... C08K 3/30

FOREIGN PATENT DOCUMENTS

| JP | 4747390 B2 | * 5/2011 | .............. C08L 67/03 |
| JP | 2013-203993 | * 10/2013 | .............. C08L 67/00 |
| KR | 10-2014-0007792 B1 | 1/2014 | |
| KR | 10-2015-0093692 B1 | 8/2015 | |
| KR | 10-2016-0096086 B1 | 8/2016 | |

OTHER PUBLICATIONS

Machine translation of JP2013203993 done Sep. 19, 2022.*
Daintith, "A Dictionary of Chemistry", 2008, Oxford University Press, 6 ed. (Year: 2008).*
Machine translation of JP 4747390 B2 (Year: 2023).*

* cited by examiner

*Primary Examiner* — Geraldina Visconti
(74) *Attorney, Agent, or Firm* — Goldilocks Zone IP Law

(57) ABSTRACT

The present disclosure relates to a liquid crystal polyester resin composition and an electronic component material comprising the same with low dust characteristics. Specifically, the present disclosure relates to a liquid crystal polyester resin composition for preventing dust generation comprising 65% by weight or more and 85% by weight or less of a liquid crystal polyester resin; more than 0.5% by weight and less than 10% by weight of a transition metal compound containing a Group 6 element of the periodic table; 2% by weight or more and 10% by weight or less of a barium compound; 2% by weight or more and 10% by weight or less of an organic filler; and 12% by weight or more and 30% by weight or less of a filler.

4 Claims, No Drawings

LIQUID CRYSTAL POLYESTER RESIN COMPOSITION AND ELECTRONIC COMPONENT MATERIAL CONTAINING THE SAME

CROSS REFERENCE TO RELATED PATENT APPLICATION

This application is based on and claims priority under 35 U.S.C. § 119 from Korean Patent Application No. 10-2020-0186502, filed on Dec. 29, 2020, in the Korean Intellectual Property Office, the disclosure of which is incorporated by reference herein in its entirety.

BACKGROUND

Field of the Invention

The present disclosure relates to a liquid crystal polyester resin composition and an electronic component material comprising the same with low dust characteristics. Specifically, the present disclosure relates to improving low-dust characteristics by preparing a liquid crystal polyester resin composition comprising a molybdenum compound and a barium compound and applying it to an electronic component material.

Description of the Related Art

Liquid crystal polyester resin compositions with high heat resistance and high flow characteristics are widely used as a material for various electric/electronic products. As small portable electronic products such as laptops are gradually excellent in performance, thinner and lighter, the use of liquid crystal polyester resin compositions having excellent moldability is increasing.

In the case of an electronic component, especially an optical device with a lens, when dust particles such as mote adhere to the lens, optical properties may be significantly deteriorated. As an example of dust particle generation, when autofocusing a camera, dust particles may be generated from the surface of the parts due to a sliding movement of the camera module parts, and the particles may be easily generated even when the device is impacted or dropped.

Accordingly, a low-dust material is required that can be applied as a semiconductor and optical material component as an electronic component material that is inevitable to miniaturize peripheral electronic devices and accessories used inside an electronic device and is sensitive to dust particles.

Liquid crystal polyester resin compositions are in the spotlight as a next-generation material for their high heat resistance and high flow characteristics, and along with these characteristics, the challenge is how to minimize the number and size of dust particles generated by external impacts.

BRIEF SUMMARY OF THE INVENTION

An object of the present disclosure is to provide a liquid crystal polyester composition capable of minimizing dust particles by including a molybdenum compound and a barium compound in a liquid crystal polyester resin and applying it to an electronic component material sensitive to dust particles generated by friction and external impacts.

In order to achieve the above object, one embodiment of the present disclosure may provide a liquid crystal polyester resin composition for minimizing dust generation including 65% by weight or more and 85% by weight or less of a liquid crystal polyester resin; and more than 0.5% by weight and less than 10% by weight of a transition metal compound containing a Group 6 element of the periodic table.

In another embodiment of the present disclosure, the liquid crystal polyester resin composition for minimizing dust generation may additionally include a barium compound in a concentration of 2% by weight or more and 10% by weight or less.

In another embodiment of the present disclosure, the liquid crystal polyester resin composition for minimizing dust generation may additionally include a filler in a concentration of 12% by weight or more and 30% by weight or less.

In another embodiment of the present disclosure, the liquid crystal polyester resin included in the liquid crystal polyester resin composition for minimizing dust generation may include 55 to 65 mol % of hydroxybenzoic acid (HBA), 15 to 25 mol % of biphenol (BP), 10 to 18 mol % of terephthalic acid (TPA), and 3 to 8 mol % of isophthalic acid (IPA).

In another embodiment of the present disclosure, the liquid crystal polyester resin included in the liquid crystal polyester resin composition for minimizing dust generation may be a wholly aromatic liquid crystal polyester formed using only an aromatic compound as a monomeric material.

In another embodiment of the present disclosure, the filler included in the liquid crystal polyester resin composition for minimizing dust generation may include at least one organic filler selected from the group consisting of carbon black, graphite, and olefinic copolymer; and at least one inorganic filler selected from the group consisting of talc, mica, glass flake, silica, quartz powder, glass beads, glass powder, calcium silicate, aluminum silicate, kaolin, clay, diatomaceous earth, wollastonite, iron oxide, titanium oxide, zinc oxide, alumina, calcium carbonate, magnesium carbonate, calcium sulfate, barium sulfate, molybdenum disulfide, silicon carbide, silicon nitride, boron nitride, and potassium titanate.

In another embodiment of the present disclosure, the transition metal compound containing a Group 6 element of the periodic table included in the liquid crystal polyester resin composition for minimizing dust generation may include at least one selected from the group consisting of molybdenum disulfide ($MoS_2$), molybdenum diselenide ($MoSe_2$), molybdenum sulfide selenide (MoSSe), molybdenum trioxide ($MoO_3$), tungsten disulfide ($WS_2$), tungsten diselenide ($WSe_2$), tungsten selenide sulfide (WSSe), and tungsten trioxide ($MoO_3$).

In another embodiment of the present disclosure, the barium compound included in the liquid crystal polyester resin composition for minimizing dust generation may include ate least one selected from the group consisting of barium sulfate, barium hydroxide, barium hydroxide monohydrate, anhydrous barium hydroxide, barium chloride, anhydrous barium chloride, barium carbonate, barium nitrate, and barium acetate.

In another embodiment of the present disclosure, the barium compound included in the liquid crystal polyester resin composition for minimizing dust generation may be a powder type compound, and the average particle diameter of the powder may be more than 1 μm and 3 μm or less.

In the present disclosure, the dust generation caused by impacts can be effectively suppressed by adding a molybdenum compound to the liquid crystal polyester resin.

The liquid crystal polyester resin composition provided in the present disclosure can minimize the number and size of dust particles generated by external impacts and internal friction, such that it can be applied to electronic component materials sensitive to dust. In particular, the improvement of optical performance such as the number of pixels and image quality of a smartphone can be achieved by applying it to a component for a camera module.

DETAILED DESCRIPTION OF INVENTION

As used herein, the term "liquid crystal polyester resin" refers to a molten polyester resin having a characteristic that the molecular chains in the polymer are regularly arranged in parallel with each other in a molten state. The state of the molecules arranged in this way is often referred to as a liquid crystal state or a nematic phase of liquid crystal material, and the molecules in such polymers are generally thin, long and flat, and have very high mechanical strength, electrical properties and heat resistance along the longer chain of molecules.

The inventors of the present disclosure have studied resins that can minimize the generation of dust caused by external impacts while maintaining the original physical properties such as excellent mechanical, thermal, electrical properties, flame retardancy, etc. of the liquid crystal polyester resin, and as a result thereof, we have obtained a liquid crystal polyester resin composition having the least dust generation by including a molybdenum compound and a barium compound having a certain particle size range in a specific liquid crystal polyester resin.

The liquid crystal polyester resin composition minimizing the generation of dust of the present disclosure may include 65% by weight or more and 85% by weight or less of a liquid crystal polyester resin; more than 0.5% by weight and less than 10% by weight of a molybdenum compound; 2% by weight or more and 10% by weight or less of a barium compound; and 12% by weight or more and 30% by weight or less of a filler.

The liquid crystal polyester resin used in the present disclosure exhibits liquid crystallinity in a molten state, and is preferably melted at a temperature of 450° C. or less.

The liquid crystal polyester resin has a weight average molecular weight of about 10,000 to 300,000, preferably about 10,000 to 50,000, when considering its mechanical strength and injection moldability.

If the weight average molecular weight of the liquid crystal polyester resin is 10,000 or less, the mechanical strength is poor, which may cause damage to the molded article, and if the weight average molecular weight exceeds 300,000, injection molding is difficult due to the decrease in fluidity of the resin.

The liquid crystal polyester resin used in the present disclosure may be included in 65% by weight or more and 85% by weight or less based on the composition, and the filler may be included in 12% by weight or more and 30% by weight or less based on the composition. If the liquid crystal polyester resin component is less than 65% by weight or the organic/inorganic filler component is more than 30% by weight, micro-injection molding becomes difficult due to poor fluidity, and if the above components are more than 85% by weight or less than 12% by weight, respectively, the strength and heat resistance are deteriorated.

The liquid crystal polyester resin in the present disclosure may be selected from the group consisting of a liquid crystal polyester amide, a liquid crystal polyester ether, a liquid crystal polyester carbonate, and a liquid crystal polyester imide.

The liquid crystal polyester resin is preferably a wholly aromatic liquid crystal polyester formed using only an aromatic compound as a monomeric material. Typical examples of the wholly aromatic liquid crystal polyester resins include resins prepared by polymerization (polycondensation) of at least one compound selected from the group consisting of an aromatic hydroxycarboxylic acid, an aromatic dicarboxylic acid, an aromatic diol, an aromatic hydroxyamine, and an aromatic diamine; resins prepared by polymerizing a plurality of aromatic hydroxycarboxylic acids; a resin prepared by polymerizing at least one compound selected from the group consisting of an aromatic dicarboxylic acid, an aromatic diol, an aromatic hydroxyamine, and an aromatic diamine; and resins prepared by polymerizing a polyester such as polyethylene terephthalate and an aromatic hydroxycarboxylic acid.

The liquid crystal polyester resin may be prepared by polycondensing at least one of the above monomers to form a prepolymer of a liquid crystal polyester, and then solid-state polycondensing the prepolymer. By-products generated during the solid-state polycondensation reaction can be removed by purging using an inert gas or vacuum.

In the present disclosure, the liquid crystal polyester resin may be a liquid crystal polyester resin composition including 55 to 65 mol % of hydroxybenzoic acid (HBA), 15 to 25 mol % of biphenol (BP), 10 to 18 mol % of terephthalic acid (TPA), and 3 to 8 mol % of isophthalic acid (IPA).

The fluidity can be secured only when the monomers of the liquid crystal polyester resin of the present disclosure are composed of the above mol % range, and the mechanical properties such as flexural strength, flexural modulus, and impact strength of a product can be improved while minimizing dust generation in the weight % ranges of a compound containing a Group 6 element of the periodic table and a barium compound.

In the present disclosure, the blending of the inorganic filler with the liquid crystal polyester resin should be performed without impairing heat resistance, electrical properties, and mechanical properties such as strength, stiffness and hardness of the polyester resin.

The inorganic filler in the present disclosure is typically used to improve mechanical strength, heat resistance, and dent characteristics due to impacts. As an example of the inorganic filler in the present disclosure, any filler may be used as long as it is a non-fibrous filler, and a plate-type filler may include talc, mica, glass flake, and the like. Further, examples of a granular filler may include silicates such as silica, quartz powder, glass beads, glass powder, calcium silicate, aluminum silicate, kaolin, clay, diatomaceous earth, and wollastonite; metal oxides such as iron oxide, titanium oxide, zinc oxide, and alumina; metal carbonates such as calcium carbonate and magnesium carbonate; metal sulfates such as calcium sulfate and barium sulfate; molybdenum disulfide; silicon carbide; silicon nitride; boron nitride; potassium titanate, etc. One or more of these may be used in combination. In the present disclosure, it is preferable to use a combination of mica as a plate-type filler, and barium sulfate and molybdenum disulfide as a granular filler.

The organic filler in the present disclosure may be used in combination of one or more selected from the group consisting of carbon black, graphite, and olefinic copolymer. In particular, the impact resistance of the liquid crystal polyester resin composition to external impacts can be improved by including the olefinic copolymer. Examples of the olefinic copolymer include a copolymer comprising a repeating unit derived from an α-olefin and a repeating unit derived from a glycidyl ester of an α,β-unsaturated acid. Typically, the α-olefin may include an ethylene, and the glycidyl ester of β-unsaturated acid may include an acrylic acid glycidyl ester, a methacrylic acid glycidyl ester, an ethacrylic acid glycidyl ester, and the like. The methacrylic acid glycidyl ester is particularly preferred.

In the present disclosure, through the combination of the organic filler and the inorganic filler, the dent characteristics can be improved and the number and size of dust particles generated by external impacts and frictions can be minimized.

The combination of the organic filler and the inorganic filler is preferably carbon black, olefinic copolymer, barium sulfate, mica, and molybdenum disulfide. The carbon black is used for the purpose of securing light-shielding properties, and the blending amount of carbon black may be included in an amount of 1% by weight or more and 5% by weight or less. If the blending amount of carbon black is less than 1% by weight, the darkness of the obtained liquid crystal polyester resin composition is lowered, and thus the light-shielding property cannot be sufficiently secured, while if it exceeds 5% by weight, the carbon black cannot be uniformly dispersed in the liquid crystal polyester resin composition, causing deterioration in physical properties, and aggregates may fall off as dust. The mica is a filler having a plate shape and may serve to improve mechanical properties and heat resistance, and to impart dimensional stability of a molded article.

In the present disclosure, the Group 6 element of the periodic table may include chromium (Cr), molybdenum (Mo), or tungsten (W), and preferably molybdenum (Mo) or tungsten (W).

In the present disclosure, the transition metal compound containing the Group 6 element of the periodic table is not limited in the application, but a molybdenum compound or a tungsten compound may be used. Preferably, at least one selected from the group consisting of molybdenum disulfide ($MoS_2$), molybdenum diselenide ($MoSe_2$), molybdenum selenide sulfide (MoSSe), molybdenum trioxide ($MoO_3$), tungsten disulfide ($WS_2$), tungsten diselenide ($WSe_2$), tungsten selenide sulfide (WSSe), and tungsten trioxide ($MoO_3$) may be used. More preferably, molybdenum disulfide ($MoS_2$) or tungsten disulfide ($WS_2$), which is a sulfide form of a transition metal may be used. Most preferably, molybdenum disulfide ($MoS_2$) may be used.

The sulfide of the transition metal has a layered structure in which layers of a transition metal are sandwiched between two layers of sulfur, and a weak van der Waals force acts between the layers, making it easy to slip and lowering the coefficient of friction, so it can be widely used as a lubricant.

Particularly, among the transition metal sulfides, molybdenum disulfide is added to plastic to obtain a composite having low frictional resistance and high strength, or vacuum-deposited on the surface of another material to obtain a high-temperature self-lubricating composite material.

In the present disclosure, by including molybdenum disulfide in the liquid crystal polyester resin, dust generated by external impacts and frictions can be minimized.

With the application of the liquid crystal polyester composition obtained by the present disclosure to an electronic component material sensitive to dust, dust generated by external impacts and frictions can be suppressed, or the number and size of the generated dust particles can be minimized.

In particular, a great improvement of optical performance such as the number of pixels and image quality of a smartphone can be achieved by applying it to a component for a camera module.

In the present disclosure, the transition metal compound containing a Group 6 element of the periodic table may be included in the range of more than 0.5% by weight and less than 10% by weight, preferably more than 0.5% by weight and 5% by weight or less, more preferably 1% by weight or more and 5% by weight or less, and most preferably 1% by weight or more and 3% by weight or less.

The difference in the mechanical properties such as flexural strength, flexural modulus, and impact strength may be shown depending on whether or not a transition metal compound containing a Group 6 element of the periodic table is added.

When the transition metal compound containing a Group 6 element of the periodic table is included, the mechanical properties as described above can be improved, but when the content is 10% by weight or more, rapid decrease in the mechanical properties may be shown.

This rapid decrease in the mechanical properties is due to the fact that excessive addition over a certain content range lowers the extrusion processability, and thus the transition metal compound is not properly dispersed in the liquid crystal polyester resin composition.

Further, when the content of the transition metal compound containing a Group 6 element of the periodic table is 10% by weight or more, dust generation may rather increase.

When the transition metal compound containing a Group 6 element of the periodic table is 0.5% by weight or less, the improvement of the mechanical properties may not be sufficiently achieved, and the amount of dust generated may increase.

In the present disclosure, the barium compound is at least one selected from the group consisting of barium sulfate, barium hydroxide, barium hydroxide monohydrate, anhydrous barium hydroxide, barium chloride, anhydrous barium chloride, barium carbonate, barium nitrate, and barium acetate.

In the present disclosure, the barium compound may be included in 2% by weight or more and 10% by weight or less based on the composition.

The addition of the barium compound makes the surface of the molded article uniform, thereby reducing dust generated by impacts and friction due to the non-uniform surface.

If the barium compound is less than 2% by weight, the effect of the addition may be insufficient, and if it exceeds 10% by weight, the fluidity of the molded article may be adversely affected and good mechanical properties may not be obtained. Further, due to poor dent characteristics, dust generated by external impacts and frictions may fall off.

In the present disclosure, the barium compound is a compound in the form of a powder, and the average particle diameter of the powder may be in the range of 1 μm or more and 3 μm or less, and preferably in the range of 2 μm or more and 3 μm or less.

In the present disclosure, the mechanical properties may differ according to the average particle diameter of the barium compound relative to the same content. It is possible to minimize the amount of dust generated by a composition in which a barium compound having a relatively small average particle diameter is applied, while improving mechanical properties such as flexural strength, flexural modulus and impact strength of the product.

If the average particle diameter of the barium compound is less than 1 μm, the mechanical properties may deteriorate. If the average particle diameter exceeds 3 μm, the surface of the product becomes rough and the probability of dust generation on the rough surface may be very high due to the friction that occurs when the camera module component slides.

After drying the liquid crystal polyester resin composition of the present disclosure and then preparing a test specimen using an injection machine, items such as flexural strength, flexural modulus, and impact strength can be evaluated.

After drying the liquid crystal polyester resin composition of the present disclosure and then preparing a test specimen using an injection machine, the flexural strength as evaluated may be in the range of between 140 MPa and 160 MPa (inclusive).

After drying the liquid crystal polyester resin composition of the present disclosure and then preparing a test specimen using an injection machine, the flexural modulus as evaluated may be in the range of between 12 GPa and 14 GPa (inclusive).

After drying the liquid crystal polyester resin composition of the present disclosure and then preparing a test specimen using an injection machine, the impact strength as evaluated may be in the range of between 640 J/m and 1,200 J/m (inclusive).

After drying the liquid crystal polyester resin composition of the present disclosure and then preparing a test specimen using an injection machine, the surface area ($\mu m^2$) of a dent portion was measured through a dent simulation tester. The surface area as measured may be in the range of between 600,000 $\mu m^2$ and 900,000 $\mu m^2$ (inclusive).

According to the present disclosure, a liquid crystal polyester resin composition having improved mechanical properties while effectively minimizing dust generation can be obtained by including the above-described constituent components. Particularly, the inclusion of the transition metal compound and the barium compound including the Group 6 element of the periodic table makes it possible to obtain an injection-molded article with minimal dust generation while maintaining the mechanical properties inherent in the liquid crystal polyester resin composition.

Hereinafter, the present disclosure will be described in detail through the following preparation examples and working examples, and it should be noted that the present disclosure is not limited thereby.

Preparation Example: Preparation of Liquid Crystal Polyester Resin 1. 13,000 g (127.3 moles) of acetic anhydride was added to a 200 L batch reactor. While stirring, monomeric para-hydroxybenzoic acid (HBA) 20,000 g (144.8 moles), biphenol (BP) 9,000 g (48.3 moles), terephthalic acid (TPA) 5,400 g (32.6 moles), and isophthalic acid (IPA) 2,600 g (15.7 moles) were added to the reactor, and then 14,100 g (138.1 moles) of acetic anhydride was further added and mixed in the batch reactor.

2. 2.8 g of a potassium acetate catalyst and 11.2 g of a magnesium acetate catalyst were added, and nitrogen was injected to make the inner space of the reactor inactive.

3. The reactor temperature was ramped up over 1 hour to a temperature at which acetic anhydride inside the batch reactor was refluxed, and the hydroxy groups of the monomers were acetylated at this temperature for 2 hours. While removing acetic acids produced in the acetylation reaction and unreacted acetic anhydrides added in excess, the reaction was heated to 320° C. at a rate of 0.5° C./min to obtain a liquid crystal polyester resin, which was discharged through a lower valve, cooled/solidified, and primary pulverized to prepare 32,000 g of liquid crystal polyester resin.

4. Then, secondary pulverization was performed using a fine-particulate grinder, and the mixture was placed in a rotary heater and the temperature was ramped to 200° C. for 2 hours while flowing nitrogen at a flow rate of 25 L/min. After holding at this temperature for 2 hours and ramping the temperature to 285° C. at a rate of 0.2° C./min, a polycondensation reaction was performed for 3 hours.

5. After the polycondensation reaction, a liquid crystal polyester resin was obtained, and the melting point of the obtained resin was 330° C.

The weight % of the liquid crystal polyester resin composition and the particle size range of barium sulfate of Examples and Comparative Examples are shown in Table 1 below, and the specific components used are shown in Table 2 below.

TABLE 1

| Unit: wt % | | | | | | | |
|---|---|---|---|---|---|---|---|
| | Ex 1 | Ex 2 | Ex 3 | C. Ex 1 | C. Ex 2 | C. Ex 3 | C. Ex 4 |
| LCP resin | 71 | 69 | 67 | 72 | 71.5 | 62 | 71 |
| Carbon black | 5 | 5 | 5 | 5 | 5 | 5 | 5 |
| 2.3 μm barium sulfate | 5 | 5 | 5 | 5 | 5 | 5 | — |
| 1 μm barium sulfate | — | — | — | — | — | — | 5 |
| Mica | 15 | 15 | 15 | 15 | 15 | 15 | 15 |
| Elastomer | 3 | 3 | 3 | 3 | 3 | 3 | 3 |
| Molybdenum disulfide | 1 | 3 | 5 | — | 0.5 | 10 | 1 |

TABLE 2

| | Manufacturer and characteristics |
|---|---|
| Liquid crystal polyester resin | SEYANG POLYMER, SEYANG LCP ® L600BB Powder |
| Carbon black | Orion Engineered Carbons, HiBlack 30L |
| 2.3 μm barium sulfate | KOCH, KCB-02 (Natural type barite made by crushing natural barite with an average particle diameter of 2.3 μm) |
| 1 μm barium sulfate | VENATOR, Blanc Fixe F (barium sulfate with an average particle diameter of 1 μm without coating an organic material) |
| Mica | YAMAGUCHI, AB-25S (average particle diameter 24 μm, aspect ratio 80) |
| Elastomer | SUMITOMO CHEMICAL CO., LTD, IGETABOND ® BF-2C (containing 6% by weight of glycidyl methacrylate) |
| Molybdenum disulfide | Climax Molybdenum Company, Molysulfide ® Technical (Fisher Number 3~4 μm) |

Example 1: Liquid Crystal Polyester Resin Composition Prepared According to the Weight % of the Component and the Particle Size of the Barium Sulfate (Prepared According to the Composition of Example 1)

1. Liquid crystal polyester resin, carbon black, mica, barium sulfate, elastomer, and molybdenum disulfide were each independently blended under the conditions of Example 1 listed in Table 1 above.

2. The above components were melted and kneaded with each other in a twin-screw extruder (L/D: 44, diameter: 30 mm) to be pelletized, and the extruder barrel temperature was 340° C. during melt-kneading, and by-products were removed through vacuum.

3. The liquid crystal polyester resin composition prepared through the melting and kneading process was mixed for 30 minutes in a copper mixer (Jeil Industrial Equipment Co., Ltd., JITD-50KW), and then dried at 150° C. for 2 hours with a hot air dryer (Jeil Industrial Equipment Co., Ltd., JIB-100KW).

Example 2: Liquid Crystal Polyester Resin Composition Prepared According to the Weight % of the Component and the Particle Size of the Barium Sulfate The liquid crystal polyester resin composition of Example 2 was prepared through the steps 1 to 3 of the Preparation Example 1 according to the weight % of each component and the particle size of the barium sulfate in Example 2.

Example 3: Liquid Crystal Polyester Resin Composition Prepared According to the Weight % of the Component and the Particle Size of the Barium Sulfate The liquid crystal polyester resin composition of Example 3 was prepared through the steps 1 to 3 of the Preparation Example 1 according to the weight % of each component and the particle size of the barium sulfate in Example 3.

Comparative Example 1: Liquid Crystal Polyester Resin Composition Prepared According to the Weight % of the Component and the Particle Size of the Barium Sulfate The liquid crystal polyester resin composition of Comparative Example 1 was prepared through the steps 1 to 3 of the Preparation Example 1 according to the weight % of each component and the particle size of the barium sulfate in Comparative Example 1.

Comparative Example 2: Liquid Crystal Polyester Resin Composition Prepared According to the Weight % of the Component and the Particle Size of the Barium Sulfate The liquid crystal polyester resin composition of Comparative Example 2 was prepared through the steps 1 to 3 of the Preparation Example 1 according to the weight % of each component and the particle size of the barium sulfate in Comparative Example 2.

Comparative Example 3: Liquid Crystal Polyester Resin Composition Prepared According to the Weight % of the Component and the Particle Size of the Barium Sulfate The liquid crystal polyester resin composition of Comparative Example 3 was prepared through the steps 1 to 3 of the Preparation Example 1 according to the weight % of each component and the particle size of the barium sulfate in Comparative Example 3.

Comparative Example 4: Liquid Crystal Polyester Resin Composition Prepared According to the Weight % of the Component and the Particle Size of the Barium Sulfate The liquid crystal polyester resin composition of Comparative Example 4 was prepared through the steps 1 to 3 of the Preparation Example 1 according to the weight % of each component and the particle size of the barium sulfate in Comparative Example 4.

Evaluation: Measurement of Mechanical Properties of Liquid Crystal Polyester Resin Composition Measurement of Flexural Strength and Flexural Modulus The test specimens prepared using the liquid crystal polyester resin compositions of Examples 1 to 3 and Comparative Examples 1 to 4 were evaluated for flexural strength and flexural modulus according to ASTM D790, and the results as evaluated are shown in Table 3 below. The evaluation was performed with a test specimen having a width of 12.7 mm, a length of 130 mm, and a thickness of 3.2 mm.

Measurement of Impact Strength

The test specimens prepared using the liquid crystal polyester resin compositions of Examples 1 to 3 and Comparative Examples 1 to 4 were evaluated for un-notched impact strength according to ASTM 256, and the results as evaluated are shown in Table 3 below. The evaluation was performed with a test specimen having a width of 12.7 mm, a length of 64 mm, and a thickness of 3.2 mm.

Measurement of Delamination

The test specimens prepared using the liquid crystal polyester resin compositions of Examples 1 to 3 and Comparative Examples 1 to 4 were fixed, and the degree of delamination was examined by referring to a cross-cut test method. The cross-cut test is a method for evaluating the degree according to the criteria for classifying the degree of delamination of a surface. This test evaluates the degree of delamination by peeling off the surface of a test specimen using a tape after scratching with a grid of a certain width. The test method is mainly used in the field of coatings used in automobiles and tiles, or vapor deposition of films such as copper or gold, but in the present disclosure, the degree of delamination of a surface was evaluated by applying it to a liquid crystal polyester resin composition. The evaluation was performed with a test specimen having a width of 12.7 mm, a length of 130 mm, and a thickness of 3.2 mm.

The cross-cut criteria (ASTM D3359) were classified into 6 stages, and the evaluation criteria are shown in Table 4 below.

In the delamination properties, it was confirmed that the degree of delamination decreases as the content of molybdenum disulfide increases as compared with Comparative Example 1 in which molybdenum disulfide was not added and Comparative Example 2 in which 0.5% by weight was added.

TABLE 3

|  | Flexural strength (MPa) | Flexural modulus (GPa) | Impact strength (J/m) | Degree of delamination |
|---|---|---|---|---|
| Ex 1 | 156 | 13.4 | 1099 | 5B |
| Ex 2 | 144 | 12.1 | 733 | 5B |
| Ex 3 | 146 | 12.4 | 640 | 5B |
| C. Ex 1 | 139 | 11.2 | 632 | 1B |
| C. Ex 2 | 140 | 11.2 | 639 | 3B |

TABLE 4

| | Explanation |
|---|---|
| 5B | 0% None |
| 4B | Lee than 5% |
| 3B | 5-15% |
| 2B | 15-35% |
| 1B | 35-65% |
| 0B | Greater than 65% |

Dent Evaluation and Its Measurement

1. A test specimen molded by an injection machine using the liquid crystal polyester resin composition of Examples 1 to 3 and Comparative Examples 1 to 4 was mounted on a dust simulation tester, and a 15 g ball was dropped 50 times continuously from a height of 15 cm.

2. After the continuous drop test, the surface area ($\mu m^2$) of the dent portion of the test specimen was measured using a 3D tiling technique through an optical microscope (HIROX, XY-GB2).

3. A total of 4 tests were performed by performing the above steps 1 and 2 as one test, and the average of the surface areas of the dent portion ($\mu m^2$) in the 4 tests was calculated. The results as evaluated are shown in Table 5 below.

TABLE 5

| | 15 g Ball, 50 times continuous drop test | | | | |
|---|---|---|---|---|---|
| | TEST 1 ($\mu m^2$) | TEST 2 ($\mu m^2$) | TEST 3 ($\mu m^2$) | TEST 4 ($\mu m^2$) | Average ($\mu m^2$) |
| Ex 1 | 660,006 | 776,097 | 589,722 | 707,229 | 683,264 |
| Ex 2 | 754,635 | 748,596 | 725,684 | 762,359 | 747,819 |
| Ex 3 | 865,987 | 875,698 | 889,547 | 903,214 | 883,612 |
| C. Ex 1 | 932,545 | 912,547 | 885,347 | 895,412 | 906,463 |
| C. Ex 3 | 1,143,874 | 1,040,208 | 1,019,286 | 1,112,402 | 1,078,943 |
| C. Ex 4 | 924,365 | 986,451 | 953,654 | 892,481 | 939,238 |

The value of the dent portion surface area ($\mu m^2$) measured under the conditions of Example 1 in which the average particle diameter of barium sulfate was 2.3 $\mu m$ was smaller than the value measured under the conditions of Comparative Example 4 in which the average particle diameter of barium sulfate was 1 $\mu m$, and thus it was confirmed that when the particle diameter of barium sulfate was 1 $\mu m$ or more, the dust generated by impact could be effectively suppressed.

The value of the dent portion surface area ($\mu m^2$) measured under the conditions of Examples 1 to 3 to which molybdenum disulfide was added was smaller than the value measured under the conditions of Comparative Example 1 to which molybdenum disulfide was not added, and thus it was confirmed that when 1 to 5% by weight of molybdenum disulfide was added, the dust generated by impact could be effectively suppressed.

However, when 10% by weight of molybdenum disulfide was included in Comparative Example 3, the value of the dent portion surface area ($\mu m^2$) increased rapidly, and thus it was confirmed that when molybdenum disulfide was contained excessively, increased dust generation may be observed.

The invention claimed is:

1. A liquid crystal polyester resin composition for minimizing dust generation, comprising:
    a liquid crystal polyester resin 65% or more and 85% or less by weight;
    a molybdenum compound more than 0.5% by weight and less than 10% by weight;
    a barium compound 2% by weight or more and 10% by weight or less, wherein the barium compound is in a form of a powder, and an average particle diameter of the powder is more than 1 $\mu m$ and 3 $\mu m$ or less;
    mica and carbon black, which are fillers, in concentrations of not less than 12% by weight and not more than 30% by weight; and
    elastomers,
    wherein the liquid crystal polyester resin composition having an average surface area of the dent measured by dropping 15 g balls 50 times in a row from a height of 15 cm is more than 600,000 $\mu m^2$ and less than 900,000 $\mu m^2$.

2. The liquid crystal polyester resin composition of claim 1, wherein the liquid crystal polyester resin is a wholly aromatic liquid crystal polyester formed using only an aromatic compound as a monomeric material.

3. The liquid crystal polyester resin composition of claim 1, the filler further comprises an olefinic copolymer as an organic filler
    or the filler further include at least one of as an inorganic filler selected from the group consisting of talc, glass flake, silica, quartz powder, glass beads, glass powder, calcium silicate, aluminum silicate, kaolin, clay, diatomaceous earth, oxide, titanium oxide, zinc oxide, alumina, calcium carbonate, magnesium carbonate, calcium sulfate, silicon carbide, silicon nitride, boron nitride, potassium titanate, and graphite.

4. The liquid crystal polyester resin composition of claim 1, wherein the barium compound is at least one selected from the group consisting of barium sulfate, barium hydroxide, barium hydroxide monohydrate, anhydrous barium hydroxide, barium chloride, anhydrous barium chloride, barium carbonate, barium nitrate, and barium acetate.

* * * * *